United States Patent
Zhao et al.

(10) Patent No.: US 11,755,502 B2
(45) Date of Patent: Sep. 12, 2023

(54) METHODS OF CONTROLLING POWER CONSUMPTION, BOARDS, ELECTRONIC DEVICES AND STORAGE MEDIA

(71) Applicant: BOE Technology Group Co., Ltd., Beijing (CN)

(72) Inventors: Tianyue Zhao, Beijing (CN); Yi Bian, Beijing (CN); Xianzhen Li, Beijing (CN); Enhui Guan, Beijing (CN); Lirong Xu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 30 days.

(21) Appl. No.: 17/536,762

(22) Filed: Nov. 29, 2021

(65) Prior Publication Data

US 2022/0309009 A1    Sep. 29, 2022

(30) Foreign Application Priority Data

Mar. 25, 2021  (CN) .......................... 202110322151.9

(51) Int. Cl.
*G06F 13/16*    (2006.01)
*G06F 1/3234*   (2019.01)
*G06F 12/0806*  (2016.01)

(52) U.S. Cl.
CPC ........ *G06F 13/1605* (2013.01); *G06F 1/3275* (2013.01); *G06F 12/0806* (2013.01); *G06F 2212/1028* (2013.01)

(58) Field of Classification Search
CPC .............. G06F 13/1605; G06F 1/3275; G06F 2212/1028; G06F 12/0806
USPC ......................................................... 710/113
See application file for complete search history.

(56) References Cited

U.S. PATENT DOCUMENTS

| | | | |
|---|---|---|---|
| 7,702,940 B2* | 4/2010 | Van Gassel | G11B 20/10527 700/297 |
| 10,359,831 B2* | 7/2019 | Crawford | G06F 1/3225 |
| 2021/0405907 A1* | 12/2021 | Nagai | G06F 12/10 |
| 2022/0129171 A1* | 4/2022 | Karr | G06F 3/0683 |

* cited by examiner

*Primary Examiner* — Brian T Misiura
(74) *Attorney, Agent, or Firm* — IPRO, PLLC

(57) ABSTRACT

Provided are a method and an apparatus for controlling power consumption, a board, an electronic device and a storage medium. The method is applied to a board, and the board includes a dynamic random memory. The method includes: obtaining a data flow of the board; and controlling an active bandwidth of the dynamic random memory according to the data flow.

10 Claims, 3 Drawing Sheets

METHODS OF CONTROLLING POWER CONSUMPTION, BOARDS, ELECTRONIC DEVICES AND STORAGE MEDIA

CROSS REFERENCE TO RELATED APPLICATIONS

This application claims priority to Chinese Patent Application No. 202110322151.9 entitled "METHODS AND APPARATUSES FOR CONTROLLING POWER CONSUMPTION, BOARDS, ELECTRONIC DEVICES AND STORAGE MEDIA" filed on Mar. 25, 2021, the entire content of which is incorporated herein by reference.

TECHNICAL FIELD

The present disclosure relates to the field of board power consumption technologies, and in particular to methods and apparatuses for controlling power consumption, boards, electronic devices and storage media.

BACKGROUND

Board is a type of printed circuit board which is abbreviated as PCB board. The board can be used as a main board of a computer or inserted into an insertion slot of a main board through an insertion core reserved during manufacturing to control operation of hardware such as display, acquisition card and the like. After drive programs are installed, corresponding hardware functions can be achieved.

SUMMARY

The present disclosure provides methods and apparatuses for controlling power consumption, boards, electronic devices and storage media to solve shortcomings of the related arts.

According to a first aspect of embodiments of the present disclosure, provided is a method of controlling power consumption. The method is applied to a board. The board includes a dynamic random memory. The method includes: obtaining a data flow of the board; and controlling an active bandwidth of the dynamic random memory according to the data flow.

In one embodiment, the board further includes one or more write controllers, one or more read controllers and a cache controller; and obtaining the data flow of the board includes: obtaining a write data flow through a transmission channel between the one or more write controllers and the cache controller; obtaining a read data flow through a transmission channel between the one or more read controllers and the cache controller; and determining the data flow according to the write data flow and the read data flow.

In one embodiment, the board further includes a read and write bus arbitrator; obtaining the write data flow through the transmission channel between the one or more write controllers and the cache controller includes: determining a target write controller from the write controllers according to an arbitration result of the read and write bus arbitrator; and obtaining the write data flow through a transmission channel between the target write controller and the cache controller; and obtaining the read data flow through the transmission channel between the one or more read controllers and the cache controller includes: determining a target read controller from the read controllers according to the arbitration result of the read and write bus arbitrator; and obtaining the read data flow through a transmission channel between the target read controller and the cache controller.

In one embodiment, obtaining the data flow of the board includes: obtaining a bandwidth of the data flow.

In one embodiment, determining the data flow according to the write data flow and the read data flow includes: determining the data flow by summing a bandwidth of the write data flow and a bandwidth of the read data flow; or, comparing the bandwidth of the write data flow and the bandwidth of the read data flow and determining a larger bandwidth as the data flow.

In one embodiment, the board further includes a flash memory and a power supply controller of the dynamic random memory, and the dynamic random memory comprises a plurality of dynamic random sub-memories; and controlling the active bandwidth of the dynamic random memory according to the data flow includes: determining a desired number of active dynamic random sub-memories according to the bandwidth of the data flow and a bandwidth of each of the plurality of dynamic random sub-memories; in response to that the desired number is smaller than a number of already-activated dynamic random sub-memories, determining at least one of the already-activated dynamic random sub-memories as at least one to-be-idled sub-memory, and for each of the at least one to-be-idled sub-memory, transferring a configuration file in the to-be-idled sub-memory to the flash memory, and cutting off power supply to the to-be-idled sub-memory through the power supply controller; and in response to that the desired number is greater than a number of already-activated dynamic random sub-memories, determining at least one un-activated dynamic random sub-memory with a number equal to a difference between the number of the already-activated dynamic random sub-memories and the desired number as at least one to-be-activated sub-memory, and for each of the at least one to-be-activated sub-memory, reading a configuration file of the to-be-activated sub-memory from the flash memory, transferring the configuration file to the to-be-activated sub-memory, and restoring power supply to the to-be-activated sub-memory through the power supply controller.

According to a second aspect of embodiments of the present disclosure, provided is an apparatus for controlling power consumption. The apparatus is applied to a board, and the board includes a dynamic random memory. The apparatus includes an obtaining module, configured to obtain a data flow of the board; and a controlling module, configured to control an active bandwidth of the dynamic random memory according to the data flow.

In one embodiment, the board further includes one or more write controllers, one or more read controllers and a cache controller; the obtaining module includes: a write data flow obtaining unit, configured to obtain a write data flow through a transmission channel between the one or more write controllers and the cache controller; a read data flow obtaining unit, configured to obtain a read data flow through a transmission channel between the one or more read controllers and the cache controller; and a data flow summarizing unit, configured to determine the data flow according to the write data flow and the read data flow.

In one embodiment, the board further includes a read and write bus arbitrator; the write data flow obtaining unit is configured to: determine a target write controller from the write controllers according to an arbitration result of the read and write bus arbitrator; and obtain the write data flow through a transmission channel between the target write controller and the cache controller; and the read data flow obtaining unit is configured to: determine a target read controller from the read controllers according to the arbitration result of the read and write bus arbitrator; and obtain the read data flow through a transmission channel between the target read controller and the cache controller.

In one embodiment, when obtaining the data flow of the board, the obtaining module is configured to obtain a bandwidth of the data flow.

In one embodiment, the board further includes a flash memory and a power supply controller of the dynamic random memory, and the dynamic random memory comprises a plurality of dynamic random sub-memories; and the controlling module is configured to: determine a desired number of active dynamic random sub-memories according to the bandwidth of the data flow and a bandwidth of each of the plurality of dynamic random sub-memories; in response to that the desired number is smaller than a number of already-activated dynamic random sub-memories, determine at least one of the already-activated dynamic random sub-memories as at least one to-be-idled sub-memory, and for each of the at least one to-be-idled sub-memory, transfer a configuration file in the to-be-idled sub-memory to the flash memory, and cut off power supply to the to-be-idled sub-memory through the power supply controller; and in response to that the desired number is greater than a number of already-activated dynamic random sub-memories, determine at least one un-activated dynamic random sub-memory with a number equal to a difference between the number of the already-activated dynamic random sub-memories and the desired number as at least one to-be-activated sub-memory, and for each of the at least one to-be-activated sub-memory, read a configuration file of the to-be-activated sub-memory from the flash memory, transfer the configuration file to the to-be-activated sub-memory, and restore power supply to the to-be-activated sub-memory through the power supply controller.

According to a third aspect of embodiments of the present disclosure, provided is a board, including a processor, and a data input interface, a data output interface, a dynamic random memory, a flash memory, a power source and a power supply controller of the dynamic random memory which are respectively connected with the processor; wherein one or more write controllers, one or more read controllers, a read and write bus arbitrator and a cache controller are disposed in the processor, and the cache controller is connected with the dynamic random memory; and the dynamic random memory includes a plurality of dynamic random sub-memories, and the power supply controller is configured to control power supply to each of the plurality of dynamic random sub-memories.

According to a fourth aspect of embodiments of the present disclosure, provided is an electronic device. The electronic device includes a memory and a processor. The memory is configured to store computer instructions executable on the processor, and the processor is configured to, when executing the computer instructions, implement the methods according to the first aspect.

According to a fifth aspect of embodiments of the present disclosure, provided is a non-transitory computer readable storage medium having computer programs stored thereon. The programs are executed by a processor to implement the methods according to the first aspect.

It should be understood that the above general descriptions and the subsequent detailed descriptions are merely illustrative and explanatory rather than limiting of the present disclosure.

BRIEF DESCRIPTION OF DRAWINGS

The accompanying drawings, which are incorporated in and constitute a part of the present description, illustrate embodiments consistent with the present disclosure and serve to explain the principles of the present disclosure together with the description.

DETAILED DESCRIPTION

Figure 1:
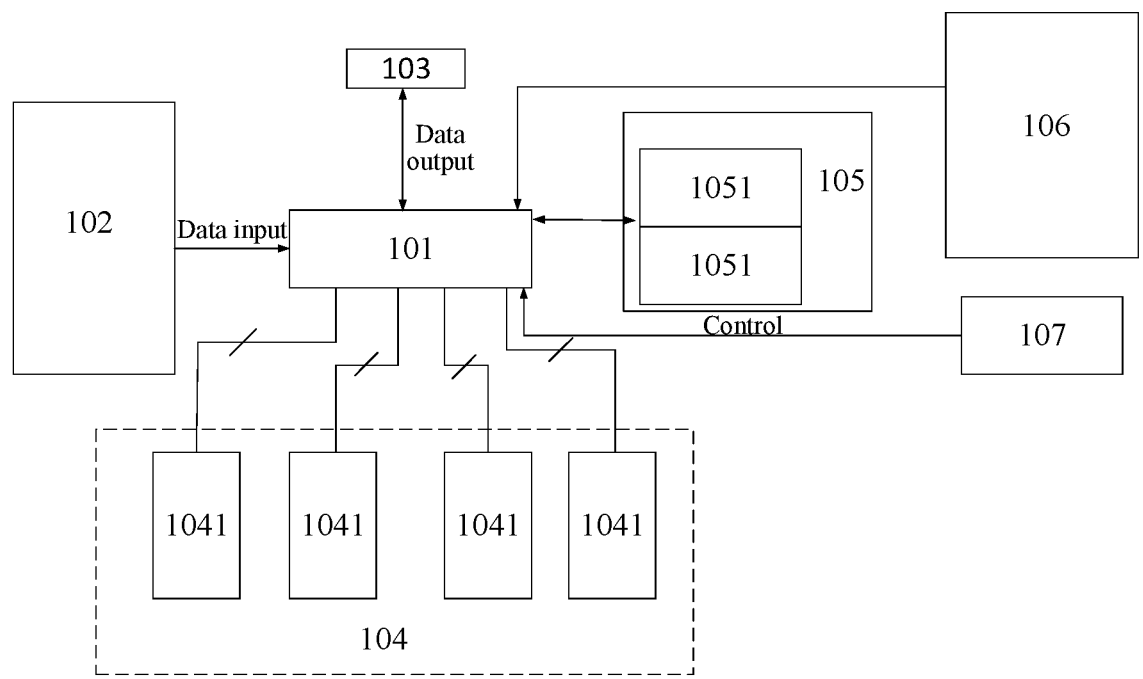
FIG. 1 is a structural schematic diagram illustrating a board according to an embodiment of the present disclosure.

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular embodiments only, rather than limiting of the present disclosure. Terms "a", "the" and "said" in their singular forms in the present disclosure and the appended claims are also intended to include plurality, unless clearly indicated otherwise in the context. It should also be understood that the term "and/or" as used herein refers to and includes any or all possible combinations of one or more of the associated listed items.

It is to be understood that although different information may be described using the terms such as first, second, third, etc. in the present disclosure, these information should not be limited to these terms. These terms are used only to distinguish the same type of information from each other. For example, without departing from the scope of the present disclosure, the first information may also be referred to as the second information and similarly, the second information may also be referred to as the first information. Depending on the context, the word "if" as used herein may be interpreted as "when" or "as" or "determining in response to".

Boards may lead to some power consumption in a data processing and transmission process. In the related arts, some energy wastes are produced due to lack of effective control for power consumption of boards.

Figure 2:
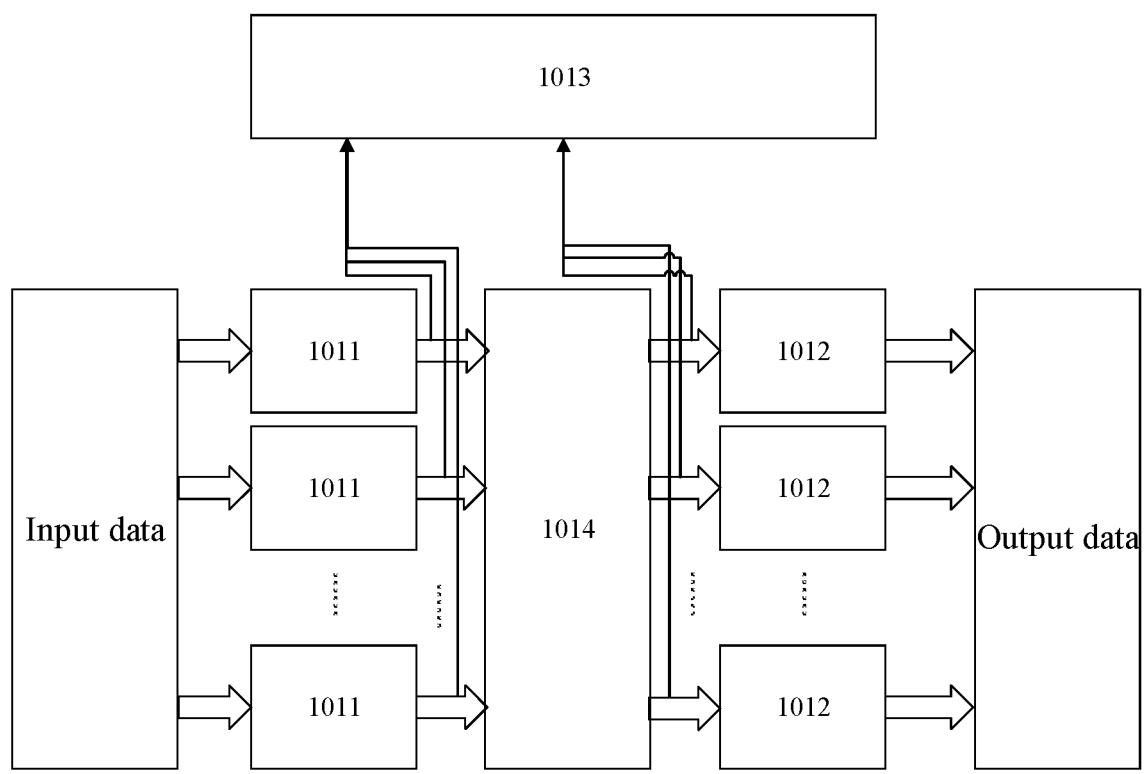
FIG. 2 is a schematic diagram illustrating an interior of a processor according to an embodiment of the present disclosure.

In order to solve the problem of energy wastes of a board in the related arts, one or more embodiments of the present disclosure provide a method of controlling power consumption, which is applied to a board. Before introduction to the method of controlling power consumption, the functionality and the structure of the board will be firstly detailed in combination with FIGS. 1 and 2.

The board includes a processor 101 (CPU), and a data input interface 102, a data output interface 103, a dynamic random memory 104, a flash memory/flash EPROM 105, a power source 106, and a power supply controller 107 of the dynamic random memory 104, which are connected with the processor 101 respectively. A write controller 1011, a read controller 1012, a read and write bus arbitrator 1013 and a cache controller 1014 are disposed in the processor 101, and the cache controller 1014 is connected with the dynamic random memory 104. In some embodiments, the processor 101 further includes one or more of a write data bandwidth detector, a read data bandwidth detector, a total bandwidth analyzer, a bandwidth controller and a reference clock module. The dynamic random memory 104 includes a plurality of dynamic random sub-memories 1041, and the power supply controller 107 is configured to control power supply to each of the plurality of dynamic random sub-memories 1041.

The data input interface 102 may be a video input interface such as an HDMI interface, a DP interface, or a DVI interface. The data output interface 103 may be a video output interface such as a display screen interface. The dynamic random memory 104 may be a DDR2 SDRAM, or DDR3 SDRAM or the like. The flash memory 105 may be a Flash memory 1051 or the like. There may be one or more for each of the above. The power source 106 may be internally provided with a power source management module or the like and capable of supplying power to the processor 101.

The write controller 1011 may be connected with the data input interface 102 to convert data input by the data input interface 102 into a storage format of the cache controller 1014, and store the data in the cache controller 1014. The processor 101 may be internally provided with a plurality of write controllers 1011, each of which is connected with a data input interface 102, respectively. The read controller 1012 may be connected with the data output interface 103 to read data stored in the cache controller 1014, convert the data into a format desired by the data output interface 103, and transmit the data to the data output interface 103. The processor 101 may be internally provided with a plurality of read controllers 1012, each of which is connected with a data output interface 103, respectively. There is only one of the plurality of write controllers 1011 each time to perform data transmission with the cache controller 1014, and there is only one of the plurality of read controllers 1012 each time to perform data transmission with the cache controller 1014. In this case, the read and write bus arbitrator 1013 is configured to select a write controller 1011 and/or a read controller 1012 for performing data transmission with the cache controller 1014. For example, when video 1 is input through the data input interface 102, data of the video 1 is written into a first write controller 1011 (FIFO). If the cache controller 1014 is in an idle state, the data in the first write controller 1011 is written into the cache controller 1014, thus occupying a control resource of the cache controller 1014. Data of video 2 is written into a second write controller 1011 to await the first write controller 1011 to complete operation for the cache controller 1014, that is, after the video 1 is written into the cache controller 1014, the first write controller 1011 releases the occupation for the cache controller 1014. Thus the second write controller 1011 may occupy the cache controller 1014 to write the video 2 into the cache controller 1014, thereby completing cyclic operations of two videos. For another example, the video data is read from the cache controller 1014 in a manner similar to the manner in which the video data is written into the cache controller 1014. Because a time sequence of external displaying is slow and a time sequence of reading data from the cache controller 1014 is fast, the read controller 1012 is adopted to cache the data read from the cache controller 1014, so as to coordinate a difference in time sequences of the data. The cache controller 1014 is configured to write data into and read data from the dynamic random memory 104.

Figure 3:
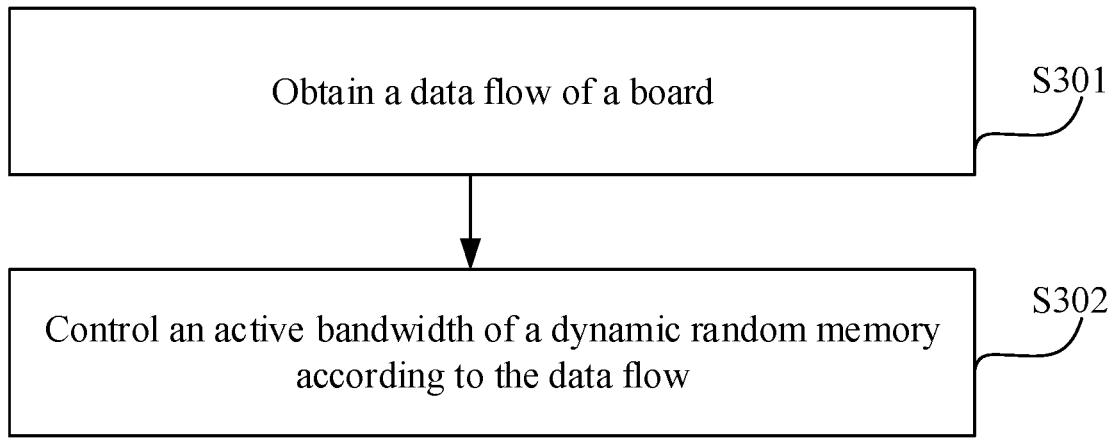
FIG. 3 is a flowchart illustrating a method of controlling power consumption according to an embodiment of the present disclosure.

Next, based on the above introduction to the structure and functionality of the board, one or more embodiments of the present disclosure provide a method of controlling power consumption. FIG. 3 shows a flowchart of the method. As shown in FIG. 3, the method includes steps S301 and S302.

The method may be applied to a board such as a SOC (System on Chip) board. In an example, the method may be applied to the processor 101 of the board.

At step S301, a data flow/stream of the board is obtained.

The obtained data flow is used to control a bandwidth of the dynamic random memory 104 in step S302. A bandwidth of the data flow may be obtained, so as to match the bandwidth of the data flow of the board and the bandwidth of the dynamic random memory 104.

The data flow may include a write data flow and/or a read data flow. Therefore, the write data flow and the read data flow may be obtained respectively and summarized to obtain the data flow. In an example, the data flow may be obtained in the following manner: firstly, obtaining a write data flow through a transmission channel between the one or more write controllers 1011 and the cache controller 1014; next, obtaining a read data flow through a transmission channel between the one or more read controllers 1012 and the cache controller 1014; finally, determining the data flow according to the write data flow and the read data flow.

There may be a plurality of write controllers. Therefore, when the write data flow is obtained through the transmission channel between the one or more write controllers 1011 and the cache controller 1014, a target write controller may be firstly determined from the plurality of write controllers 1011 according to an arbitration result of the read and write bus arbitrator 1013, and then the write data flow is obtained through a transmission channel between the target write controller and the cache controller 1014. That is, the write data flow is obtained from a write controller 1011 which is being in data transmission with the cache controller 1014, thereby improving the specificity, accuracy and efficiency.

There may be a plurality of read controllers. Therefore, when the read data flow is obtained through the transmission channel between the one or more read controllers 1012 and the cache controller 1014, a target read controller may be firstly determined from the plurality of read controllers 1012 according to an arbitration result of the read and write bus arbitrator 1013, and then the read data flow is obtained through a transmission channel between the target read controller and the cache controller 1014. That is, the read data flow is obtained from a read controller 1012 which is being in data transmission with the cache controller 1014, thereby improving the specificity, accuracy and efficiency.

When the read data flow and the write data flow are summarized, a sum of a bandwidth of the read data flow and a bandwidth of the write data flow may be determined as a summarization result, or a larger bandwidth thereof is determined as a summarization result.

At step S302, an active bandwidth of the dynamic random memory is controlled according to the data flow.

A desired number of active dynamic random sub-memories 1041 is firstly determined according to the bandwidth of the data flow and a bandwidth of each of the plurality of dynamic random sub-memories 1041; then the bandwidth is controlled according to a relationship between the desired number of active dynamic random sub-memories and a number of already-activated dynamic random sub-memories 1041. That is, in response to that the desired number of active dynamic random sub-memories is smaller than the number of already-activated dynamic random sub-memories 1041, at least one (for example, the number equal to a difference between the desired number of active dynamic random sub-memories and the number of the already-activated dynamic random sub-memories 1041) of the already-activated dynamic random sub-memories 1041 is determined as at least one to-be-idled sub-memory, and for each of the at least one to-be-idled sub-memory, a configuration file in the to-be-idled sub-memory is transferred to the flash memory 105, and power supply to the to-be-idled sub-memory is cut off through the power supply controller 107. And, in response to that the desired number of active dynamic random sub-memories is greater than the number of already-activated dynamic random sub-memories 1041, at least one un-activated dynamic random sub-memory 1041 with a number equal to a difference between the number of the already-activated dynamic random sub-memories 1041 and the desired number of active dynamic random sub-memories are determined as at least one to-be-activated sub-memory, and for each of the at least one to-be-activated sub-memory, a configuration file of the to-be-activated sub-memory is read from the flash memory 105 and transferred to the to-be-activated sub-memory, and power supply to the to-be-activated sub-memory is restored through the power supply controller 107.

When a configuration file in a sub-memory is transferred to the flash memory 105 and the power supply to the sub-memory is cut off, the sub-memory is idled or hung up. In this case, the sub-memory will no longer cause power consumption, thereby saving the power consumption of these idled sub-memories.

The number of at least one to-be-idled sub-memory may be obtained by subtracting the desired number of the active dynamic random sub-memories 1041 from the number of already-activated dynamic random sub-memories 1041. The number of at least one to-be-activated sub-memory may be obtained by subtracting the number of already-activated dynamic random sub-memories 1041 from the desired number of the active dynamic random sub-memories 1041. That is, after the at least one to-be-idled sub-memory is idled, the number of the already-activated dynamic random sub-memories 1041 is equal to the desired number of the active dynamic random sub-memories 1041; after the at least one to-be-activated sub-memory is activated, the number of the already-activated dynamic random sub-memories 1041 is equal to the desired number of the active dynamic random sub-memories 1041.

In a display system, usually, a use amount of the bandwidth of the dynamic random memory 104 is basically constant after a mode is selected, whereas the use amount of the bandwidth may change significantly during mode switching (for example, input channel selection, or input source change or the like). For example, when an input video is changed from a video format of resolution 1920×1080 to a video format of resolution 3840×2160, the use amount of the bandwidth will be four times the original use amount. The method of controlling power consumption according to the embodiments of the present disclosure can accurately adjust bandwidth when the mode for the display system is switched.

For example, the dynamic random memory 104 includes four dynamic random sub-memories 1041. A bandwidth desired by the resolution of the input video may be analyzed using a total bandwidth analyzer. If 32 bits are desired, configuration data for the last two dynamic random sub-memories 1041 is transferred to the flash memory 105. The processor 101 stops the data reading and writing of the last two dynamic random sub-memories 1041, and at the same time and gives one control signal to control power supply to the two dynamic random sub-memories 1041 to be cut off. Data reading and writing is performed through the first two dynamic random sub-memories 1041. When a high resolution video is transmitted, for example, the total data is 64 bits, the configuration information in the flash memory 105 is restored to the corresponding dynamic random sub-memories 1041 and the processor 101 restores power supply to those two dynamic random sub-memories 1041 at the same time.

According to the above embodiments, the data flow of the board is obtained, and the active bandwidth of the dynamic random memory is controlled based on the data flow, such that the active bandwidth of the dynamic random memory is in a non-constant state. That is, the bandwidth of the dynamic random memory is not all activated constantly but in a changing state. Therefore, when the bandwidth is not all activated, some energy consumption can be saved. Because the specific active bandwidth is controlled based on the data flow of the board, the bandwidth can satisfy the requirements of the data flow. Furthermore, when the bandwidth is not all activated, some energy consumption can be saved.

Figure 4:
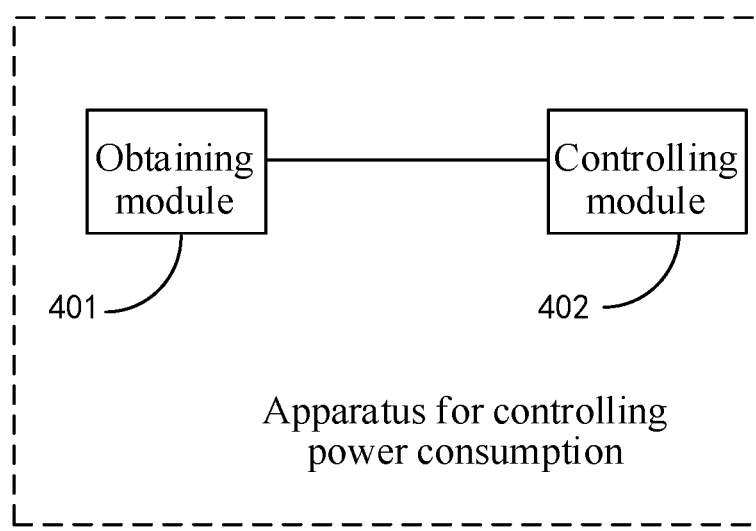
FIG. 4 is a structural schematic diagram illustrating an apparatus for controlling power consumption according to an embodiment of the present disclosure.

According to another aspect of one or more embodiments of the present disclosure, provided is an apparatus for controlling power consumption. The apparatus is applied to a board, and the board includes a dynamic random memory. FIG. 4 is a structural schematic diagram of the apparatus. As shown in FIG. 4, the apparatus includes an obtaining module 401, configured to obtain a data flow of the board; and a controlling module 402, configured to control an active bandwidth of the dynamic random memory according to the data flow.

In some embodiments, the board further includes one or more write controllers, one or more read controllers and a cache controller; and the obtaining module includes: a write data flow obtaining unit, configured to obtain a write data flow through a transmission channel between the one or more write controllers and the cache controller; a read data flow obtaining unit, configured to obtain a read data flow through a transmission channel between the one or more read controllers and the cache controller; and a data flow summarizing unit, configured to determine the data flow according to the write data flow and the read data flow.

In some embodiments, the board further includes a read and write bus arbitrator; the write data flow obtaining unit is configured to: determine a target write controller from the write controllers according to an arbitration result of the read and write bus arbitrator; and obtain the write data flow through a transmission channel between the target write controller and the cache controller; and the read data flow obtaining unit is configured to: determine a target read controller from the read controllers according to the arbitration result of the read and write bus arbitrator; and obtain the read data flow through a transmission channel between the target read controller and the cache controller.

In some embodiments, when obtaining the data flow of the board, the obtaining module is configured to obtain a bandwidth of the data flow.

In some embodiments, the board further includes a flash memory and a power supply controller of the dynamic random memory, and the dynamic random memory includes a plurality of dynamic random sub-memories; the controlling module is configured to: determine a desired number of active dynamic random sub-memories according to the bandwidth of the data flow and a bandwidth of each of the plurality of dynamic random sub-memories; in response to that the desired number is smaller than a number of already-activated dynamic random sub-memories, determine at least one of the already-activated dynamic random sub-memories as at least one to-be-idled sub-memory, and for each of the at least one to-be-idled sub-memory, transfer a configuration file in the to-be-idled sub-memory to the flash memory, and cut off power supply to the to-be-idled sub-memory through the power supply controller; and in response to that the desired number is greater than a number of already-activated dynamic random sub-memories, determine at least one un-activated dynamic random sub-memory with a number equal to a difference between the number of the already-activated dynamic random sub-memories and the desired number as at least one to-be-activated sub-memory, and for each of the at least one to-be-activated sub-memory, read a configuration file of the to-be-activated sub-memory from the flash memory, transfer the configuration file to the to-be-activated sub-memory, and restore power supply to the to-be-activated sub-memory through the power supply controller.

The specific manner in which various modules in the apparatuses according to the above embodiments perform operations has been detailed in the embodiments relating to the methods and thus will not be repeated herein.

Figure 5:
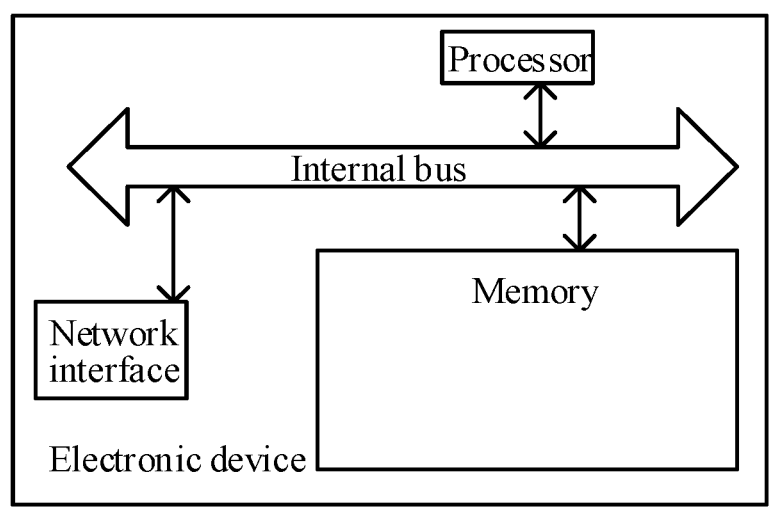
FIG. 5 is a structural schematic diagram illustrating an electronic device according to an embodiment of the present disclosure.

According to another aspect of one or more embodiments of the present disclosure, provided is an electronic device. FIG. 5 shows a structure of the electronic device. As shown in FIG. 5, the electronic device includes a memory and a processor. The memory is configured to store computer instructions executable on the processor, and the processor is configured to, when executing the computer instructions, implement the methods of controlling power consumption.

According to another aspect of one or more embodiments of the present disclosure, provided is a non-transitory computer readable storage medium having computer programs stored thereon. The programs are executed by a processor to implement the methods of controlling power consumption.

In the present disclosure, the term "first" and "second" are used for the purpose of descriptions only and shall not be understood as indicating or implying any relative importance. The term "plurality" refers to two or more unless otherwise stated clearly.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and embodiments are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

What is claimed is:

1. A method of controlling power consumption, applied to a board comprising a dynamic random memory, and the method comprising:

obtaining a data flow of the board; and
controlling an active bandwidth of the dynamic random memory according to the data flow;
wherein the board further comprises one or more write controllers, one or more read controllers, a cache controller and a read and write bus arbitrator; and
obtaining the data flow of the board comprises:
determining a target write controller from the write controllers according to an arbitration result of the read and write bus arbitrator;
obtaining a write data flow through a transmission channel between the target write controller and the cache controller;
determining a target read controller from the read controllers according to the arbitration result of the read and write bus arbitrator;
obtaining a read data flow through a transmission channel between the target read controller and the cache controller; and
determining the data flow according to the write data flow and the read data flow.

2. The method of claim 1, wherein obtaining the data flow of the board comprises:
obtaining a bandwidth of the data flow.

3. The method of claim 1, wherein determining the data flow according to the write data flow and the read data flow comprises:
determining the data flow by summing a bandwidth of the write data flow and a bandwidth of the read data flow; or,
comparing the bandwidth of the write data flow and the bandwidth of the read data flow and determining a larger bandwidth as the data flow.

4. The method of claim 2, wherein the board further comprises a flash memory and a power supply controller of the dynamic random memory, and the dynamic random memory comprises a plurality of dynamic random sub-memories; and
controlling the active bandwidth of the dynamic random memory according to the data flow comprises:
determining a desired number of active dynamic random sub-memories according to the bandwidth of the data flow and a bandwidth of each of the plurality of dynamic random sub-memories;
in response to that the desired number is smaller than a number of already-activated dynamic random sub-memories, determining at least one of the already-activated dynamic random sub-memories as at least one to-be-idled sub-memory, and for each of the at least one to-be-idled sub-memory, transferring a configuration file in the to-be-idled sub-memory to the flash memory, and cutting off power supply to the to-be-idled sub-memory through the power supply controller; and
in response to that the desired number is greater than a number of already-activated dynamic random sub-memories, determining at least one un-activated dynamic random sub-memory with a number equal to a difference between the number of the already-activated dynamic random sub-memories and the desired number as at least one to-be-activated sub-memory, and for each of the at least one to-be-activated sub-memory, reading a configuration file of the to-be-activated sub-memory from the flash memory, transferring the configuration file to the to-be-activated sub-memory, and restoring power supply to the to-be-activated sub-memory through the power supply controller.

5. A board, comprising a processor, and a data input interface, a data output interface, a dynamic random memory, a flash memory, a power source and a power supply controller of the dynamic random memory which are respectively connected with the processor;

wherein one or more write controllers, one or more read controllers, a read and write bus arbitrator and a cache controller are disposed in the processor, and the cache controller is connected with the dynamic random memory; and the dynamic random memory comprises a plurality of dynamic random sub-memories, and the power supply controller is configured to control power supply to each of the plurality of dynamic random sub-memories;

wherein the processor is configured to determine a target write controller from the write controllers according to an arbitration result of the read and write bus arbitrator; obtain a write data flow through a transmission channel between the target write controller and the cache controller; determine a target read controller from the read controllers according to the arbitration result of the read and write bus arbitrator; obtain a read data flow through a transmission channel between the target read controller and the cache controller; and determine a data flow of the board according to the write data flow and the read data flow.

6. An electronic device, comprising a memory and a processor, wherein the memory is configured to store computer instructions executable on the processor, and the processor is configured to, when executing the computer instructions, implement:

obtaining a data flow of a board, wherein the board comprise a dynamic random memory; and controlling an active bandwidth of the dynamic random memory according to the data flow;

wherein the board further comprises one or more write controllers, one or more read controllers, a cache controller and a read and write bus arbitrator; and obtaining the data flow of the board comprises:

determining a target write controller from the write controllers according to an arbitration result of the read and write bus arbitrator;

obtaining a write data flow through a transmission channel between the target write controller and the cache controller;

determining a target read controller from the read controllers according to the arbitration result of the read and write bus arbitrator;

obtaining a read data flow through a transmission channel between the target read controller and the cache controller; and determining the data flow according to the write data flow and the read data flow.

7. The electronic device of claim 6, wherein obtaining the data flow of the board comprises:

obtaining a bandwidth of the data flow.

8. The electronic device of claim 6, wherein determining the data flow according to the write data flow and the read data flow comprises:

determining the data flow by summing a bandwidth of the write data flow and a bandwidth of the read data flow; or, comparing the bandwidth of the write data flow and the bandwidth of the read data flow and determining a larger bandwidth as the data flow.

9. The electronic device of claim 7, wherein the board further comprises a flash memory and a power supply controller of the dynamic random memory, and the dynamic random memory comprises a plurality of dynamic random sub-memories; and controlling the active bandwidth of the dynamic random memory according to the data flow comprises:

determining a desired number of active dynamic random sub-memories according to the bandwidth of the data flow and a bandwidth of each of the plurality of dynamic random sub-memories;

in response to that the desired number is smaller than a number of already-activated dynamic random sub-memories, determining at least one of the already-activated dynamic random sub-memories as at least one to-be-idled sub-memory, and for each of the at least one to-be-idled sub-memory, transferring a configuration file in the to-be-idled sub-memory to the flash memory, and cutting off power supply to the to-be-idled sub-memory through the power supply controller; and in response to that the desired number is greater than a number of already-activated dynamic random sub-memories, determining at least one un-activated dynamic random sub-memory with a number equal to a difference between the number of the already-activated dynamic random sub-memories and the desired number as at least one to-be-activated sub-memory, and for each of the at least one to-be-activated sub-memory, reading a configuration file of the to-be-activated sub-memory from the flash memory, transferring the configuration file to the to-be-activated sub-memory, and restoring power supply to the to-be-activated sub-memory through the power supply controller.

10. A non-transitory computer readable storage medium having computer programs stored thereon, wherein the programs are executed by a processor to implement the method of claim 1.

* * * * *